US012376022B2

(12) United States Patent
Tzubary et al.

(10) Patent No.: US 12,376,022 B2
(45) Date of Patent: Jul. 29, 2025

(54) COMMUNICATION SYSTEM AND METHOD FOR REDUCED CONTACT DETAILS (71) Applicant: One Smart Star Ltd., Tortola (VG)

(72) Inventors: Hemy Tzubary, Savyon (IL); Yakov Shulman, Kiryat Ono (IL); David Sussan, Yehud Monosson (IL)

(73) Assignee: One Smart Star Ltd., Tortola (VG)

( * ) Notice: Subject to any disclaimer, the term of this patent is extended or adjusted under 35 U.S.C. 154(b) by 399 days.

(21) Appl. No.: 17/997,247

(22) PCT Filed: Apr. 29, 2021

(86) PCT No.: PCT/IL2021/050497
§ 371 (c)(1),
(2) Date: Oct. 27, 2022

(87) PCT Pub. No.: WO2021/220282
PCT Pub. Date: Nov. 4, 2021

(65) Prior Publication Data
US 2023/0171681 A1 Jun. 1, 2023

Related U.S. Application Data (60) Provisional application No. 63/017,708, filed on Apr. 30, 2020.

(51) Int. Cl.
H04W 48/18 (2009.01)
H04W 8/12 (2009.01)

(52) U.S. Cl.
CPC ............ *H04W 48/18* (2013.01); *H04W 8/12* (2013.01)

(58) Field of Classification Search
None
See application file for complete search history.

(56) References Cited

U.S. PATENT DOCUMENTS 8,385,537 B1 * 2/2013 Yablon .............. H04M 1/27485
379/355.06
9,467,542 B1 * 10/2016 Messenger ........ H04M 3/42051
(Continued)

FOREIGN PATENT DOCUMENTS

WO 2007036924 4/2007
WO WO-2016209824 A1 * 12/2016 ............. H04L 12/16

OTHER PUBLICATIONS

International Search Report for corresponding application PCT/IL2021/050497 mailed on Aug. 1, 2021.

*Primary Examiner* — Anh Vu H Ly
(74) *Attorney, Agent, or Firm* — Heidi Brun Associates Ltd.; Heidi Brun (57) ABSTRACT A unified number coordinator is in a server for an internet communications app on a mobile device of a user. The coordinator includes a roaming checker which receives region of origin information from the server, in response to identification of the user of a mobile device running the app. It also receives location information of the mobile device and determines if the user is in the region of origin or in a different region. An app router receives a unified number dialed by the user, the region of origin and, if the user is roaming, the different region. The app router provides a first business and its address associated with the unified number in the region of origin and, if the user is roaming, a second business and its address associated with the unified number in the different region, for the user to select.

4 Claims, 5 Drawing Sheets (56) References Cited

U.S. PATENT DOCUMENTS

| | | |
|---|---|---|
| 9,898,176 B2 | 2/2018 | Tzubary et al. |
| 2005/0020270 A1 | 1/2005 | Buckley |
| 2006/0068786 A1 | 3/2006 | Florence |
| 2010/0099406 A1 | 4/2010 | Anantharaman et al. |
| 2015/0106784 A1* | 4/2015 | Tzubary .................... G06F 8/36 |
| | | 717/109 |
| 2018/0054720 A1* | 2/2018 | Messenger .......... H04W 68/005 |

* cited by examiner

COMMUNICATION SYSTEM AND METHOD FOR REDUCED CONTACT DETAILS

CROSS REFERENCE TO RELATED APPLICATIONS

This application is a national phase filing from PCT Patent Application PCT/IL2021/050497, filed Apr. 29, 2021, which claims priority from U.S. provisional patent application 63/017,708, filed Apr. 30, 2020, both of which are incorporated herein by reference.

FIELD OF THE INVENTION

The present invention relates generally to communication systems.

BACKGROUND OF THE INVENTION

PCT Patent Application PCT/IL2005/001044 to Mecilati, published as WO 2007/036924, commonly owned by Applicant and incorporated herein by reference, describes a method for providing a business with a unified communications number for all types of customer communication and mapping the unified communications number to each address for the business. Mecilati describes his method as solving the problem customers had in dealing with the multiple contact details of a business. Specifically, Mecilati said:

"The contemporary individual is typically overwhelmed with contact details, the majority of which he cannot hope to remember. He must be equipped at the very least with an address book, or preferably, with an electronic organizer. Keeping up with ever-increasing contact details, due to the advances of communications technology, and ever-changing contact details, due to physical relocations, area-code changes, communications service provider switches, etc. has graduated from a minor inconvenience to a more bothersome aggravation."

Figure 1:
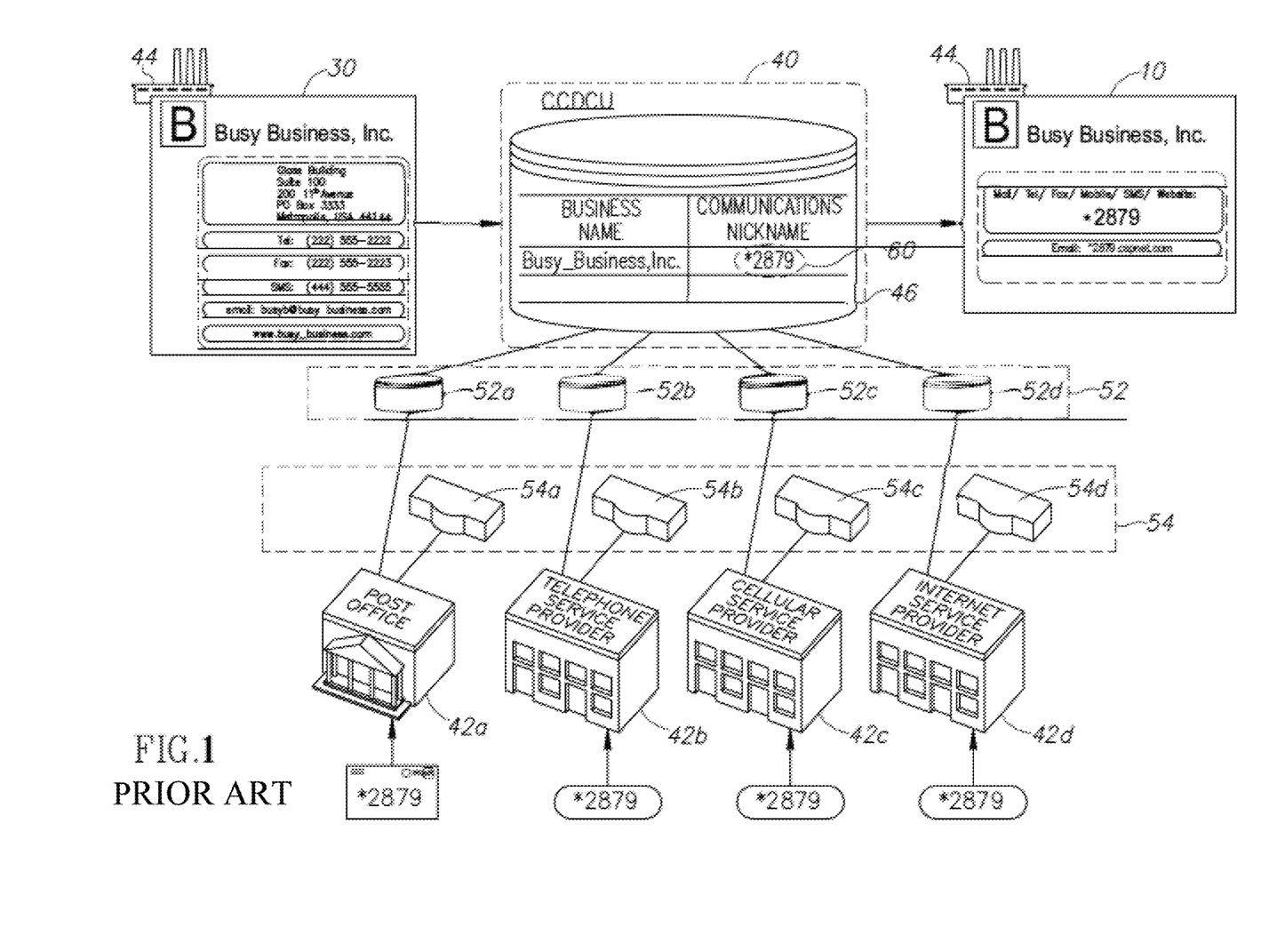
FIG. 1 is a schematic illustration of a prior art communications system providing a unified communications number.

Reference is now made to FIG. 1, which is FIG. 3 of Mecilati, which illustrates a multi-provider communication system having a compact contact details coordination unit (CCDCU) 40, operative in conjunction with various types of communications service providers (CSPs) 42. CCDCU 40 coordinated assignments of unique communications nicknames 60 to businesses 44 and comprised a database 46 in which an association between each business 44 and its assigned communications nickname 60 was recorded.

Each communication service provider 42, such as a post office 42a, a telephone service provider 42b, a cellular phone service provider 42c and an internet service provider 42d, maintained and operated a database 52 and a router 54 for routing each unique communications nickname to its proper address. The data in each database 52 of each CSP 42 was regularly updated by CCDCU 40 and included the names of the businesses served by the CSP, the full-length contact details assigned to each business by the CSP, and the compact contact details assigned to each business by the CSP. When a customer sends a communication using a compact nickname 60, the CSP 42 handling the communication employs its router 54 to route the communication to its correct destination according to the data stored in its database 52.

SUMMARY OF THE INVENTION

There is therefore provided, in accordance with a preferred embodiment of the present invention, a unified number coordinator implementable in a server for an internet communications app implemented on a mobile device of a user. The coordinator includes a roaming checker and an app router. The roaming checker receives country or region of origin information from a user registration portion of the server, and, in response to identification of the user of a mobile device running the internet communications app, receives current location information of the mobile device. The roaming checker determines if the user is in the country or region of origin or if the user is roaming in a different country or region. The app router receives a unified number dialed by the user, the country or region of origin and, if the user is roaming, the different country or region, and provides a first business and its at least one address associated with the unified number in the country or region of origin and, if the user is roaming, a second business and its at least one address associated with the unified number in the different country or region, the user to select between the first and second businesses in the app.

Moreover, in accordance with a preferred embodiment of the present invention, the app is operative to activate communications with the selected first or second business.

Further, in accordance with a preferred embodiment of the present invention, the communications are via one of: voice, chat, video and visual IVR (interactive voice response).

Still further, in accordance with a preferred embodiment of the present invention, the unified number has 2-8 alphanumeric characters after a first character which is a *, **, a #, or a ##symbol.

There is also provided, in accordance with a preferred embodiment of the present invention, a method for providing communication between businesses and customers over an internet communication app. The method includes the internet communication app adding an app router to route unified communication numbers to their associated local communication address, the internet communication app connecting the app router to a compact contact details coordination unit (CCDCU), the CCDCU updating the app router with data about unified communication numbers of businesses associated with the internet communication app, the internet communication app receiving a communication for one of the businesses from one of the customers, the communication using one of the unified communication numbers, and the internet communication app using the app router to route the communication to a relevant communication address associated with the one of the unified communication numbers.

Further, in accordance with a preferred embodiment of the present invention, the communication is via one of: voice, chat, video and visual IVR.

Finally, in accordance with a preferred embodiment of the present invention, the unified communication numbers have 2-8 alphanumeric characters after a first character which is a *, **, a #, or a ##symbol.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the problems identified by Mecilati, of multiple communication addresses for a business, still exist, though with the more modern communication technologies. Despite Mecilati's unified communications system, businesses still find themselves needing to procure yet another address in yet another communications space. The newer communications methods cannot transmit their calls or messages using unified communications numbers, since these numbers, which begin with a symbol (usually * or #) rather than a digit, are not recognized by the newer communications entities.

In addition, Applicant has realized that the same unified communications number may refer to different entities in different countries and thus, a customer of a global communications entity, such as WhatsApp, Viber or Messenger, cannot utilize the unified communications number s/he is used to when traveling abroad, even if such an entity could parse the number.

Finally, Applicant has realized that information which such global communications entities utilize may provide the solution.

Figure 2:
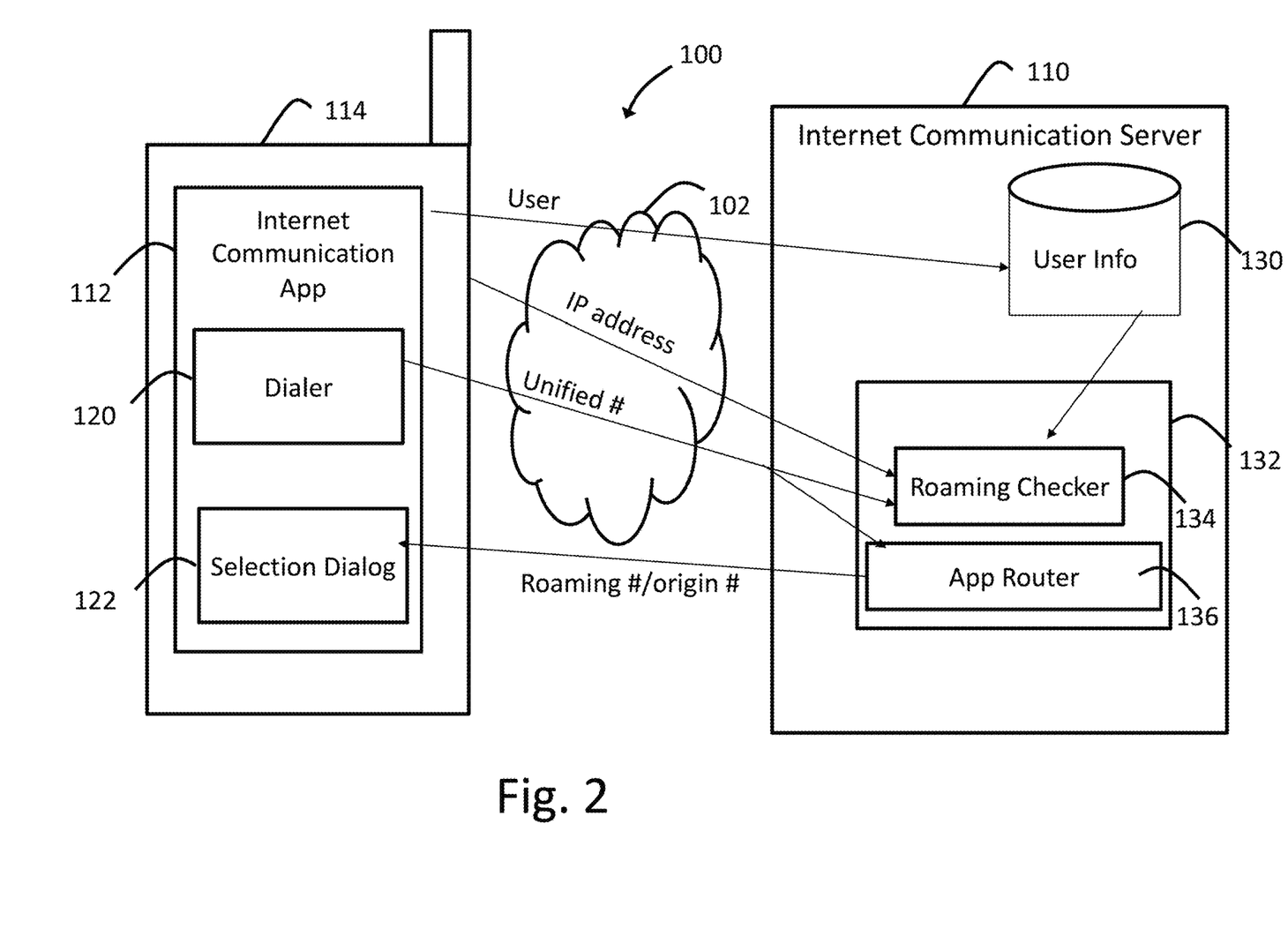
FIG. 2 is a schematic illustration of a data network communications system for a mobile app providing a unified communications number.

Reference is now made to FIG. 2, which illustrates a data network communication system 100 to implement unified numbers for internet-based entities and particularly, for global, internet-based, communications entities. Communication system 100 may operate across a data network, such as the Internet 102, and may comprise at least one internet communication server 110 operative to receive calls or message requests from an internet communication application or "app" 112 on at least one mobile device 114. Server 110 and app 112 may implement any type of global communication entity which may provide calling, messaging and/or videoing over data network 102. For example, server 110 and app 112 may implement any one of the apps of WhatsApp, Viber, Messenger, WeChat, Line, Telegram, BBM Blackberry Messenger, IMO, Kakaotalk, Skype, KIK, SnapChat, Zalo or any other internet communication system.

Internet communication app 112 may comprise a "dialer" 120 by which a user of mobile device 114 may connect with another user, such as a business, to either talk with, message with or send a video to the business. Dialer 120 may provide the unified number, such as *2587, to server 110. Unified numbers may begin with a *, a **, a #or a ##and may have between 2-8 alphanumeric characters, such as digits and/or letters.

In accordance with a preferred embodiment of the present invention, app 112 may also provide information about the mobile device 114, such as user information and mobile location information, in the form of the current IP (Internet Protocol) address of mobile device 114, to server 110. The user information may be a UserID or any other identifying information.

As is known, the IP address is a dynamic address given to any computing device connecting to a data network. For mobile devices, the IP address changes depending on how and where the mobile device connects to the Internet. Moreover, the IP address contains location information within it, a portion of which indicates the country or region of the World where the device currently is.

Server 110 may comprise a user database 130 and a unified number coordinator 132. User database 130 may be any suitable database storing user registration information. This may comprise the userID, user's name, cellphone number, home address, and country or region.

User database 130 may receive the user information from internet app 112 and may provide the user's country of origin, which is typically stored therein, to unified number coordinator 132. Coordinator 132 may comprise a roaming checker 134 and an app router 136.

App router 136 may comprise a table comprising at least the following for each business: the business name, its unified number, the country, countries or regions in which it uses the unified number and the local address(es) (phone number(s), email address(es), street address(es), etc.) associated with its unified number in that region. It will be appreciated that app router 136 may be updated regularly as businesses acquire or change unified communications numbers. As discussed in more detail in FIG. 3, app router 136 may regularly receive updates from a compact contact details coordination unit (CCDCU) 40', operating similarly to the described in PCT Patent Application PCT/IL2005/001044 to Mecilati, published as WO 2007/036924.

Roaming checker 134 may receive the IP address of mobile device 114 and the unified number which the user utilized and may check both whether or not the user is roaming and, if s/he is roaming, may provide all relevant businesses which have the unified number, both in the user's country of origin and in the user's current country of roaming.

To do so, roaming checker 134 may parse the current IP address of mobile device 114 to determine the country or region where mobile device 114 currently is and may compare it to the country or region of origin from user database 130. If they are the same, roaming checker 134 may provide the country of origin to app router 136. In turn, app router 136 may provide app 112 with the business name and business phone number or other address associated with the unified communications number in the user's country or region of origin.

However, if the country or region of origin and roaming are different, roaming checker 134 may provide app 112 with both countries or regions to app router 136 which may, in turn, provide the business names and business phone numbers/addresses associated with the unified communications number in both the user's country or region of origin and in the user's current country or region to a selection dialog 122 of app 112.

Selection dialog 122 may ask the user to choose which business, the one in his country or region of origin or the one in the country or region he currently is in, to communicate with. Once the user chooses, selection dialog 122 may provide the relevant business address/phone number to dialer 120 and, in this way, may connect the user to the business of his choice within app 112.

Dialer 120 may use the business address/phone number to activate communications with the selected business. This may be via call, message or video conference. In addition, dialer 120 may activate a visual IVR associated with the selected business. An exemplary visual IVR system might be the one described in U.S. Pat. No. 9,898,176, commonly owned by Applicant and incorporated herein by reference.

It will be appreciated that unified number coordinator 132 may be implemented in any suitable manner, such as part of server 110 or as an SDK (software development kit). Alternatively, or in addition, app router 136 may be updated via an API (application programming interface) call forming part of server 110 to receive the relevant information stored in CCDCU 40, such as names of the businesses served by app, the full-length contact details assigned to each business by the relevant communication service provider (CSP), and the unified communications number assigned to each business by CCDCU 40.

It will be appreciated that data network communication system 100 may enable various internet communication apps, such as WhatsApp, Viber, Messenger, WeChat, Line, Telegram, BBM Blackberry Messenger, IMO, Kakaotalk, Skype, KIK, SnapChat, Zalo or any other internet communication system, to work more effectively with businesses, and particularly, with businesses which have unified communication numbers for their communications with other communication service providers. This may encourage more businesses to utilize such apps more extensively.

Figure 3:
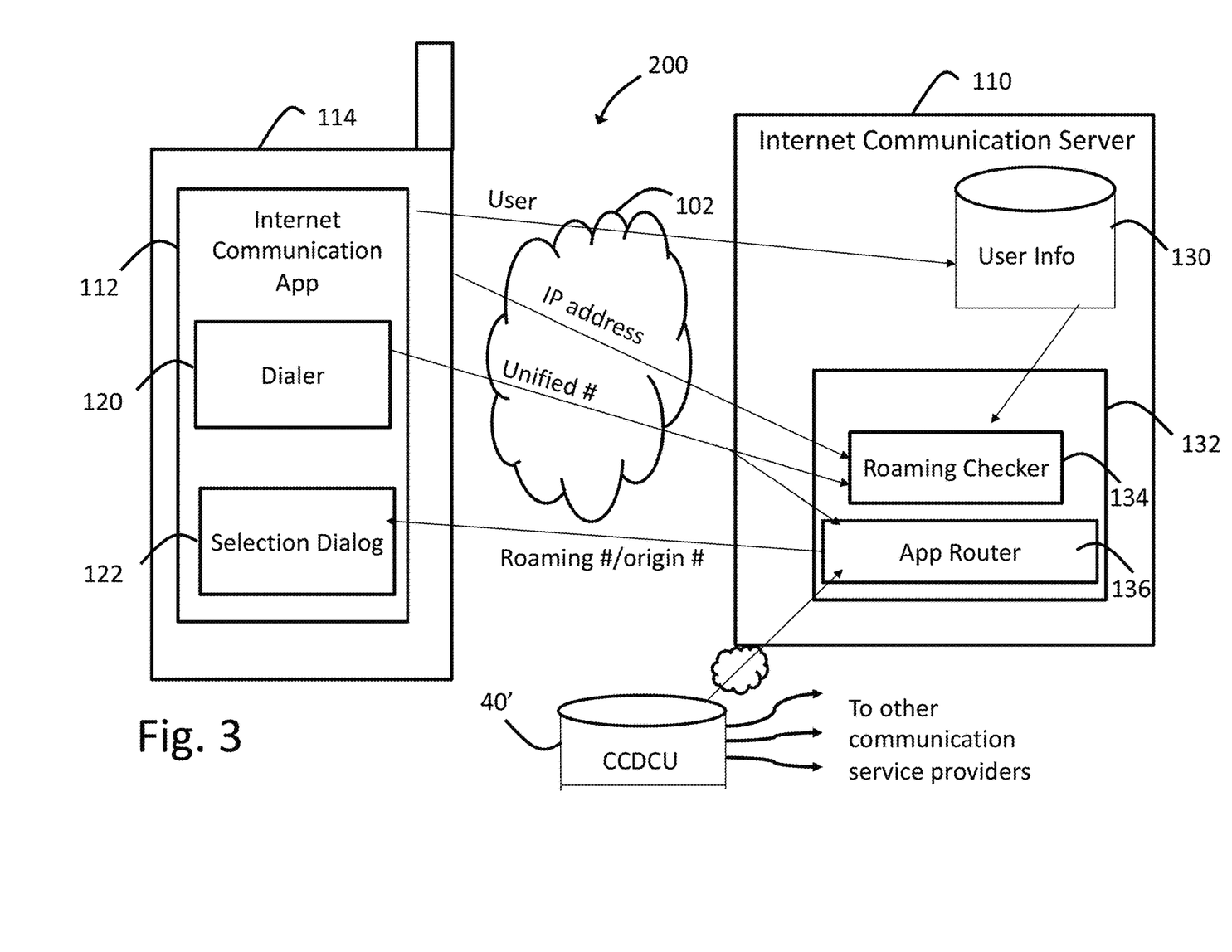
FIG. 3 is a schematic illustration of an integrated, multi-modal communications network.

It will also be appreciated that data network communication system 100 may form part of an integrated, multi-modal communications network 200, shown in FIG. 3 to which reference is now made, where a single unified communication number may be utilized to smoothly connect with communication service providers of all kinds, such as telecom providers, internet service providers, internet communication providers, app providers and even physical mail providers.

Integrated, multi-modal communications network 200 may comprise CCDCU 40' which may provide the same unified communication numbers to app router 136 of internet communication server 110 and to routers 54 of other communication service providers 42, such as post office 42a, telephone service provider 42b, cellular service provider 42c, and internet service provider 42d of FIG. 1.

Moreover and as discussed hereinabove, the various communication service providers are not limited to a particular region or country and thus, multi-modal communications network 200 may provide internet communication apps with the ability to provide businesses with smooth access to their customers, wherever they are or wherever they travel to.

Figure 4:
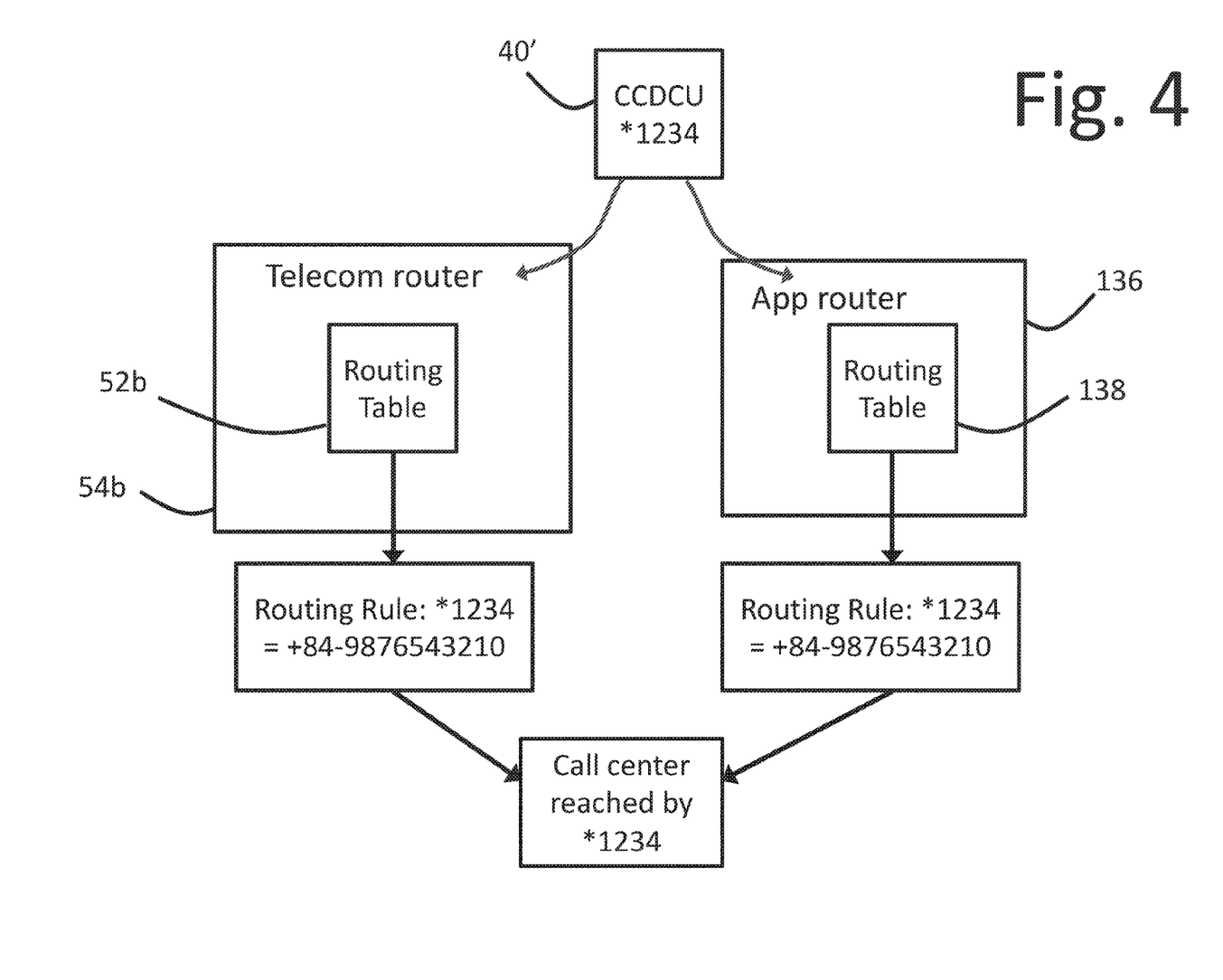
FIGS. 4 and 5 are schematic illustrations of how the multi-modal communications network of FIG. 3 operates.

Reference is now made to FIG. 4, which illustrates how multi-modal communications network 200 operates. CCDCU 40' may store all of the data related to the unified communication numbers and may be any suitable, internet accessible database or storage unit. CCDCU 40' may be a single database or may be multiple interconnected databases which may be spread throughout the world to provide fast internet access to all service providers.

CCDCU 40' may regularly update routing tables, such as routing table 52b of telecom router 54b and routing table 138 of app router 136, with the most current set of unified communication numbers related to their associated service providers. Thus, for example, CCDCU 40' may update routers 54b and 136 with a unified communication number *1234 which may have a routing rule of "+84-9876543210". When a customer calls the telecom operator using *1234, its router 54b will access its routing table 52b and will dial 84-9876543210. When a customer activates a call within an internet communication app, such as WhatsApp, using *1234, its app router 136 will access its routing table 138 and then dial 84-9876543210.

Figure 5:
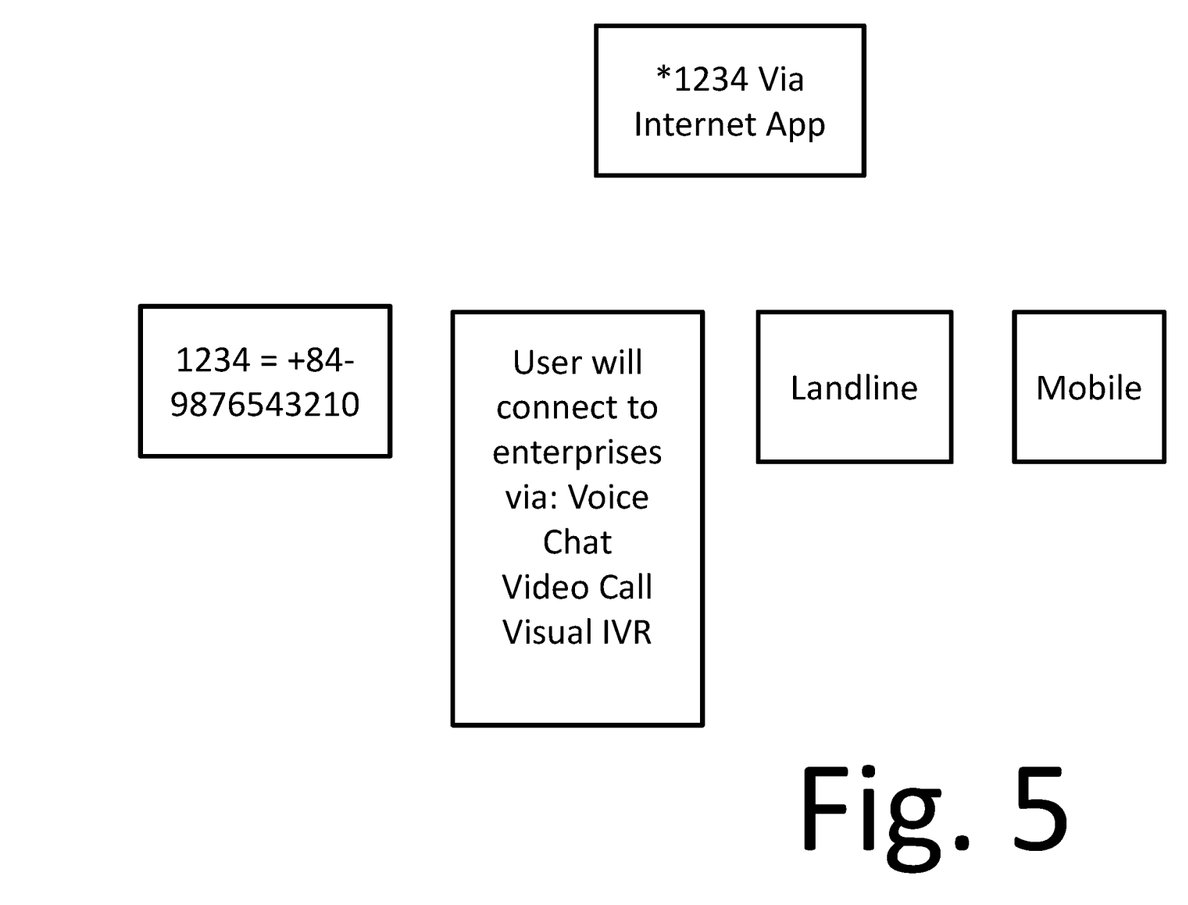

Thus, as indicated by FIG. 5, to which reference is now briefly made, a customer or user may access a business using the same unified communication number, such as *1234, via voice, chat, video call or visual IVR, from his/her landline, mobile phone, app, etc. It will be appreciated that any internet communications business which has an app may join multi-modal communications network 200 by adding an associated app router 136 and connecting app router 136 to CCDCU 40'. By doing so, such an internet communications business may enable its business customers to solve the problems identified by Mecilati, of multiple communication addresses for a business, and may reduce the addresses down to a single unified communication address, that of the unified communication number. Moreover, by doing so, such an internet communications business may receive the global reach that such unified communications numbers have.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A unified number coordinator implementable in a server for an internet communications app implemented on a mobile device of a user, the coordinator comprising:

a roaming checker to receive country or region of origin information from a user registration portion of said server, in response to identification of said user of a mobile device running said internet communications app, to receive current location information of said mobile device, and to determine if said user is in said country or region of origin or if said user is roaming in a different country or region; and an app router to receive a) a unified number dialed by said user, b) said country or region of origin and, c) if said user is roaming, said different country or region, and to provide a first business and its at least one address associated with said unified number in said country or region of origin and, if said user is roaming, a second business and its said at least one address associated with said unified number in said different country or region, said user to select between said first business and said second business in said internet communications app.

2. The coordinator according to claim 1 and wherein said internet communications app is operative to activate communications with said selected first or second business.

3. The coordinator according to claim 2 and wherein said communications are via one of: voice, chat, video and visual IVR (interactive voice response).

4. The coordinator according to claim 1 and wherein said unified number has 2-8 alphanumeric characters after a first character which is a *, **, a #, or a ##symbol.

* * * * *